United States Patent
Champaigne

(10) Patent No.: US 11,484,989 B2
(45) Date of Patent: Nov. 1, 2022

(54) ELECTRONIC METHOD FOR CALIBRATING PEENING INTENSITY

(71) Applicant: Electronics, Inc., Mishawaka, IN (US)

(72) Inventor: Jack M. Champaigne, Mishawaka, IN (US)

(73) Assignee: ELECTRONIC, INC., Mishawaka, IN (US)

( * ) Notice: Subject to any disclaimer, the term of this patent is extended or adjusted under 35 U.S.C. 154(b) by 247 days.

(21) Appl. No.: 16/799,394

(22) Filed: Feb. 24, 2020

(65) Prior Publication Data

US 2020/0269388 A1  Aug. 27, 2020

Related U.S. Application Data

(60) Provisional application No. 62/809,782, filed on Feb. 25, 2019.

(51) Int. Cl.
*B24C 7/00* (2006.01)
*B24C 1/10* (2006.01)
*G01L 5/00* (2006.01)

(52) U.S. Cl.
CPC .............. *B24C 7/00* (2013.01); *B24C 1/10* (2013.01); *G01L 5/0052* (2013.01)

(58) Field of Classification Search
CPC ............ B24C 7/00; B24C 1/10; G01L 5/0052
See application file for complete search history.

(56) References Cited

U.S. PATENT DOCUMENTS

| | | |
|---|---|---|
| 2,350,440 A | 6/1944 | Almen |
| 4,470,292 A | 9/1984 | DeClark et al. |
| 5,113,680 A | 5/1992 | Matsuura et al. |
| 5,284,039 A * | 2/1994 | Torgerson .............. B24D 13/20 72/53 |
| 6,640,596 B2 | 11/2003 | Yamanoto et al. |
| 7,954,348 B2 | 6/2011 | Forgues et al. |
| 9,061,392 B2 | 6/2015 | Forgues et al. |
| 10,202,663 B2 * | 2/2019 | Zheng ..................... C21D 6/002 |
| 10,330,544 B2 * | 6/2019 | Blais ...................... G01L 5/0052 |
| 2013/0074305 A1 * | 3/2013 | Tolentino ................. G01B 5/30 29/407.05 |
| 2016/0136757 A1 * | 5/2016 | May ................... B23K 26/0624 219/121.61 |
| 2016/0273984 A1 | 9/2016 | Blais et al. |

* cited by examiner

*Primary Examiner* — Douglas X Rodriguez
*Assistant Examiner* — Sangkyung Lee
(74) *Attorney, Agent, or Firm* — Botkin & Hall, LLP

(57) ABSTRACT

A method for calibrating an electronic sensor for peening intensity. A range of desired intensity levels is chosen and that range may contain a single value or multiple values. The parameters for a blast stream are set that correspond to a particular intensity level. Test strips are peened in the blast stream and then the arcs of the peened strips are measured to determine the intensity level of the blast stream. Subsequently, a sensor is placed in the blast stream set at particular intensity levels and the signal generated at each intensity level is recorded. A roto-flap peening device can also be set at particular intensity levels and then a sensor is subjected to the roto-flap peening device set at those levels. A chart may be developed that correlates peening intensity to the signal of the sensor so the sensor may be used in place of Almen strips.

8 Claims, 4 Drawing Sheets

ELECTRONIC METHOD FOR CALIBRATING PEENING INTENSITY

CROSS REFERENCE TO RELATED APPLICATIONS

This application claims priority of U.S. Provisional application 62/809,782, filed Feb. 25, 2019, which application is hereby incorporated in its entirety by reference.

BACKGROUND

A mechanical surface treatment method referred to as "Shot Peening" or "Shot Blasting" may be characterized by the impact force of a spherical piece of "shot" onto a target material. This action produces a compressive layer that resists fatigue failures. The intensity of the blast stream is directly related to the depth of compression achieved in the target material. SAE documents J442 and J443 describe a method of quantifying peening intensity by use of a test coupon (also referred to as an Almen strip after the inventor John Almen). The properties of the test coupon are strictly controlled. The patent for the Almen strip (U.S. Pat. No. 2,350,440) describes a test coupon that accumulates dents from the blast stream causing it to arc in a manner relative to the depth of compression, thus the impact energy. The arc of the Almen strip is measured after it has been peened to determine peening intensity. The Almen strip has become a standard in the industry (SAE J442 and J443).

All known peening processes rely upon measuring the curvature of an Almen strip that has been peened, and then setting machine parameters to achieve a particular desired curvature in the Almen strip. This is an indirect measure that determines what parameters are necessary to produce a desired curvature in an Almen strip, and those parameters correspond to the proper peening intensity. There is currently no direct way to measure intensity. Using an Almen strip is a destructive test because the Almen strip can only be used once. Setting machine parameters to levels that produce the desired curvature in an Almen strip is presently the only way to assure consistent peening. Alternative methods with other devices have been developed to measure intensity without an Almen strip and a need exists to calibrate these various methods to the results that would be achieved if an Almen strip were subjected to the same parameters. Once an alternative method is calibrated reliably to correspond to the curvature of a peened Almen strip, it is desired that such an alternative method be used to replace the use of Almen strips. In other words, if an alternative method determining peening intensity could predict the curvature that would be measured in a peened Almen strip, use of Almen strips could be avoided.

SUMMARY OF THE INVENTION

The present invention is a method for calibrating an electronic sensor for peening intensity. A range of desired intensity levels is decided upon. That range may contain a single value or multiple values for peening intensity. The parameters for a blast stream are set that correspond to a particular intensity level. Test strips are peened in the blast stream and then the arcs of the peened strips are measured to determine the intensity level of the blast stream. Subsequently, a sensor is placed in the blast stream set at particular intensity levels and the signal generated at each intensity level is recorded. The process may be carried over to a roto-flap peening device that is set at particular intensity levels. A sensor is subjected to the roto-flap peening device set at particular intensity levels. A chart may be developed that correlates peening intensity to the signal of the sensor so the sensor may be used in place of Almen strips.

DETAILED DESCRIPTION OF THE INVENTION

Calibration of an alternative peening device according to the method of this invention involves taking steps that, while initially involve an Almen strip, ultimately result in avoiding the use of Almen strips, thereby saving time and expense of traditional Almen strip measurements.

Figure 1:
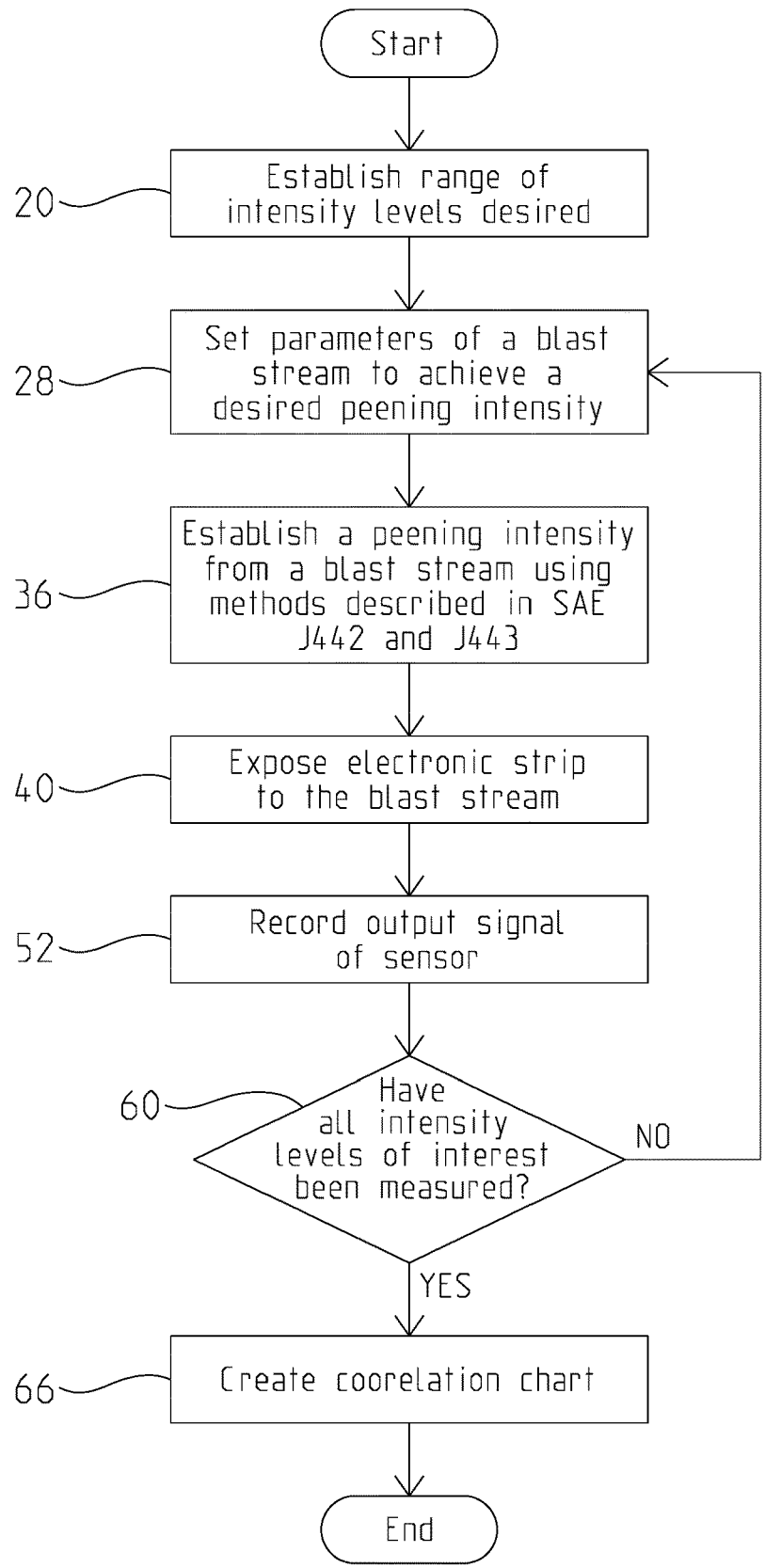
FIG. 1 is a flow chart describing a process for correlating shot peening between an electronic device for measuring peening and a traditional Almen strip used for measuring peening.

As shown in FIG. 1, as an initial step, a range of desired intensity levels is chosen 20. Once this desired range of intensity levels is established, parameters are chosen for a shot peening device so that peening intensity is set to one of the levels within the desired range of intensity levels 28. It may be the case that only one intensity level is of interest, but in the case that multiple intensity levels are desired to be calibrated, a first level is chosen to begin the method as shown at 28 in FIG. 1. The first chosen parameters correspond to a first level of peening intensity within the range of intensity levels. After setting the peening device parameters, Almen strips are peened according to SAE J442 and J443, indicated at 36 in FIG. 1. Accordingly, the arcs of the peened Almen strips are measured to determine the intensity to which the Almen strips were exposed and develop the saturation curve to determine peening intensity. According to SAE J443 this necessitates the use of a minimum of four Almen strips, with each successive strip having a longer exposure time than the previous. Intensity is a value derived from a saturation curve described in SAE J443 and is constant for a given set of machine parameters (such as those described at 28 in FIG. 1), regardless of peening time.

As an alternative to using an Almen strip, other means can be used to detect intensity. Alternate devices to measure peening intensity shown in Matsuura, U.S. Pat. No. 5,113, 680 ("'680 patent"), DeClark, U.S. Pat. No. 4,470,292 ("'292 patent"), Yamamoto, U.S. Pat. No. 6,640,596, and Blais U.S. Pat. Pub. 2016/0273984 ("'984 publication"). Each of these describes a means to detect the intensity of the blast stream with an electronic transducer that responds to the impact of shot creating an electrical signal proportional to the impact energy of the shot stream. Such an electronic device is placed within the blast stream 40 using the same parameters as were used to achieve the first level of peening intensity that is within the range of desired intensity levels. As shown in FIG. 1, this can be done after the peening of the Almen strips 36 according to SAE J443. The electronic device used at step 40 produces an electrical signal, and that signal is recorded 52 during the peening process.

The recording of the signal 52 is significantly different than measuring intensity through the use of an Almen strip. Use of an Almen strip requires the strip be exposed to the peening process in accordance with SAE J443 which imparts compression in the strip for a duration of time sufficient to accumulate impacts of the shot, and which causes the Almen strip to arc when released from its holder. Such impacts over a duration of time mean that an Almen strip behaves as an integrator over that duration of time. The electronic device indicated at step 40 need only be subjected to the blast stream for long enough time to establish a stable signal. That time required to establish a stable signal is significantly shorter than the time required to peen multiple Almen strips according to SAE J442 and J443. After a stable signal is achieved in the electronic device, a data point is produced that relates the particular signal recorded 52 during peening to an intensity measured with Almen strips. Thus, for that particular first level of intensity within the range described above, a correlation is made between the signal and the first level of intensity as measured with Almen strips according to SAE J442 and J443.

After the first level of intensity is established, a decision is made whether all of the intensity levels of interest have been measured 60. If only one intensity level of interest was established 20, then no further peening of an Almen strip is needed as indicated at 36, nor is peening of the electronic device 40 again necessary. The correlation between the peening level of interest and the electronic signal is documented as shown at 66. If a single intensity level is all that is contained in the established range 20, then the correlation chart developed 66 is a simple data point. If more levels of intensity are desired to be measured within the established range 20 (in other words, all intensity levels of interest have not been measured), then parameters of the peening machine are set for the next intensity level 28 and the successive steps 36, 40, 52 are done until all levels of interest are measured.

Making certain assumptions may allow a user of the process to skip the step indicated at 36 of peening an Almen strip for subsequent intensity levels of interest. A first assumption that would allow a user of the process to skip subsequent peening of Almen strips would be relying on the electronic sensor at 40 to accurately measure intensity. Further, not peening an Almen strip, thereby skipping the part of the process indicated at 36, may be done if the sensor is considered to have a linear relationship with peening intensity. If a linear relationship is assumed or determined through other means, the user of the process can simply peen the electronic device 40 and measure the signal to calculate an intensity as it would have been measured by an Almen strip. For instance, if the output signal of the sensor is five percent higher, that would correspond to a peening intensity that is five percent higher than the previous level. Thus, relying on a linear relationship of the digital device indicated at 40 may be used to save peening Almen strips subsequent to the first peening test 36 according to SAE J442 and J443. If the peening intensity compared to the signal recorded from the sensor 52 are properly considered linearly correlated, only one iteration of using Almen strips 36 is needed to develop the correlation chart 66.

An alternate method of shot peening involving relatively few parameters to adjust is the use of roto-flap peening as is described in SAE document AMS2590 "Rotary Flap Peening of Metal Parts." Measurement of peening intensity using the roto-flap peening tool can be accomplished by use of Almen strips coupons. (See SAE AMS2590 section 3.3). A convenient commercial device that performs roto-flap peening having a built-in RPM register is described in Forgues U.S. Pat. No. 9,061,392 Controlled Electro-Pneumatic Power Tools and Interactive Consumable and Forgues U.S. Pat. No. 7,954,348 Peening Apparatus and Method. Using roto-flap peening at a particular predetermined RPM speed can achieve the same resultant arc in a peened Almen strip that corresponds to an intensity that could be achieved using conventional shot peening.

Figure 2:
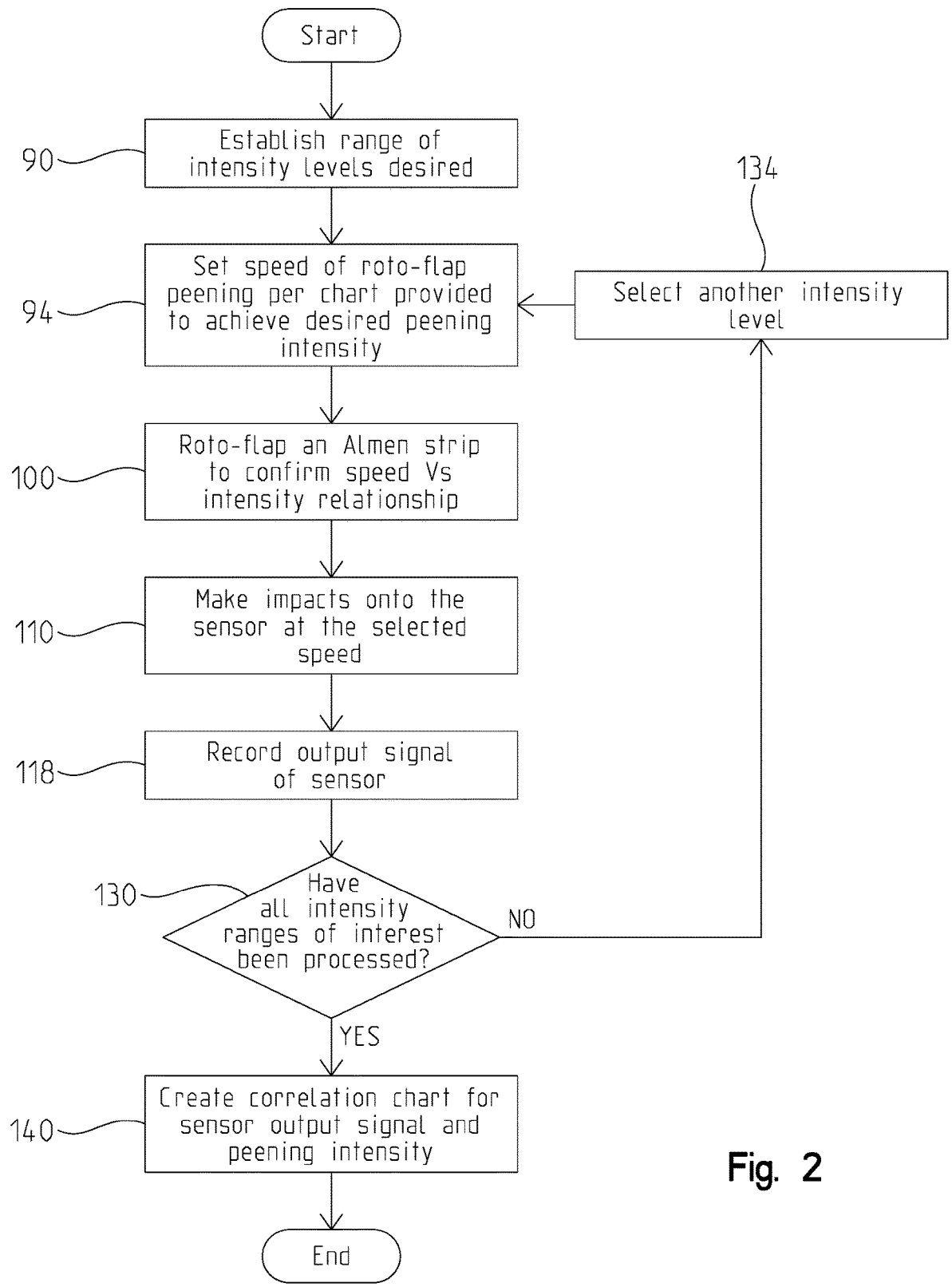
FIG. 2 is a flow chart describing a process for correlating shot peening between roto-flap peening, an electronic device for measuring peening, and an Almen strip.
Figure 3:
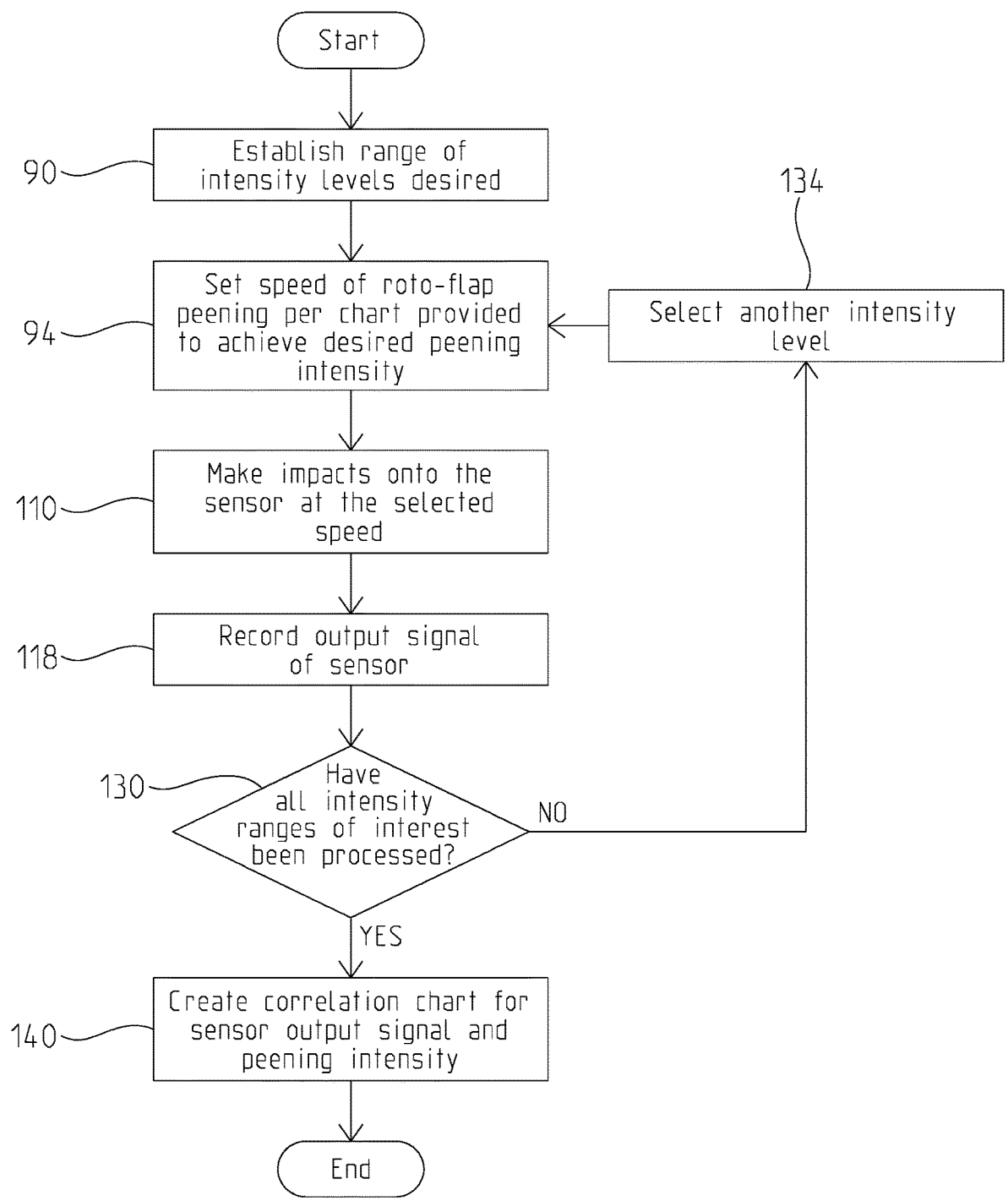
FIG. 3. is a flow chart describing a process for correlating shot peening between roto-flap peening, an electronic device for measuring peening, that skips the step of using an Almen strip and relies on the sensor alone.
Figure 4:
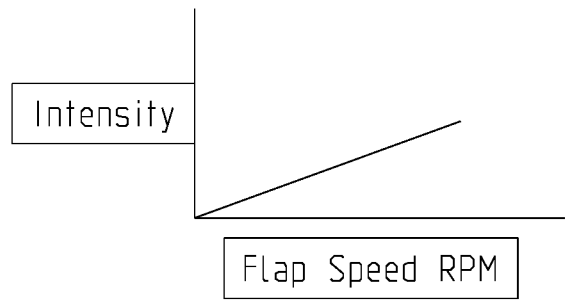
FIG. 4 is a graph showing the relationship between roto-flap RPM and peening intensity.

Using roto-flap peening instead of conventional shot peening begins with establishing a range of intensity levels that are desired 90. See FIG. 2. For a first intensity value, the rotation per minute (RPM) of the roto-flap peening tool is set 94. This RPM value is set according to the roto-flap peening device which provides a chart showing an RPM that will yield a particular intensity when a corresponding flap is used in the roto-flap peening tool. Reference to the chart included with the roto-flap peening device is how an operator chooses the correct parameters to peen according to the first intensity level that is in the range of intensity levels that are desired. Once the RPM value is set, an Almen strip is roto-flap peened 100 to confirm that the desired intensity achieved is the same as the intensity that was predicted by the chart supplied with the roto-flap peening device. This step 100 may be used to confirm the accuracy of the chart supplied with that RPM value in actual use. Unlike SAE J442 and J443, only a single Almen strip needs to be peened to verify the intensity of the roto-flap peening device. Thus, only one Almen strip is needed per intensity level as apposed to SAE J442 and 443 that require at least four Almen strips. After peening the Almen strip, the sensor is peened 110 and the output of the sensor is recorded 118. As with the conventional shot peening described above, the output of the sensor corresponds to a particular intensity level as measured by the Almen strip at 100. After the sensor output signal is recorded 118, a decision is made whether all of the intensity values have been processed 130. If all intensity values have not been processed, another intensity value is selected 134 within the range of desired levels 90. When peening another value within the range, other than the first intensity value, it is not necessary to peen another Almen strip if a linear relationship with RPM and peening intensity is assumed. As shown in FIG. 3, the user of the process can just select another intensity level 134 and then set the roto-flap peening tool per the chart provided 94.

Generally, through empirical experience it is proper to rely on a linear relationship between roto-flap RPM and intensity. Therefore, only a single Amen strip for the first intensity value needs to be peened, and repetitive peening of Almen strips can be avoided. Using only a single Almen strip further requires the assumption mentioned above that peening intensity and signal strength of the electronic sensor are linearly related. After all of the peening levels of interest are considered, a correlation chart 140 is created that correlates the sensor output signal to peening intensity. Thus, step 140 results in the graph shown as FIG. 5.

Figure 6:
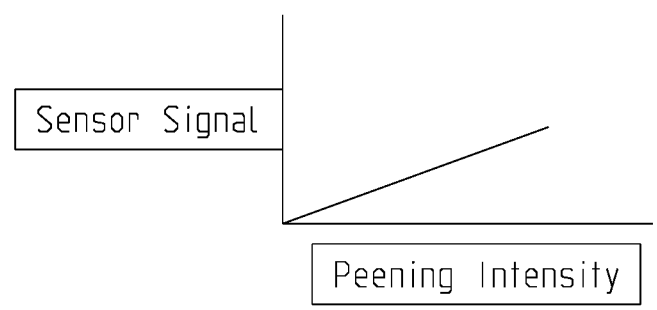
FIG. 6 is a graph showing the relationship between peening intensity and the signal of the sensor.

An achievable goal of the process is to avoid the use of Almen strips and conventional shot peening, yet peen parts with predictable and repeatable intensity. At the outset of establishing a process for achieving these goals the steps of FIG. 1 are used. Those steps in FIG. 1 establish a relationship between peening intensity and the output signal of the sensor indicated at 52 in FIG. 1. The relationship of peening intensity and the signal of the sensor are linear. FIG. 6 is a graph showing this linear relationship between peening intensity and the signal strength of the sensor. In other words, the step 66 shown in FIG. 1 results in the graph shown as FIG. 6. It may be reasonable to assume that the peening intensity and sensor signal will be linearly related. That linear relationship between conventional shot peening intensity and the output signal of a sensor can be proven through successive iterations of shot peening Almen strips 36 and comparing corresponding Almen strips to the subsequent peening of the sensor under the same conditions 40.

Figure 5:
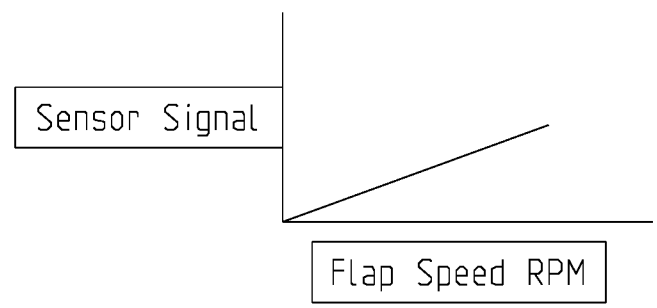
FIG. 5 is a graph showing the relationship between roto-flap speed in RPM and the signal of the sensor.

Once the linear relationship between the electronic peening sensor output at step 52 is correlated to the intensity as would be measured by an Almen strip, the electronic sensor can be used as a substitute for an Almen strip for conventional shot peening. Additionally, roto-flap peening can be used instead of conventional shot peening. The steps of FIG. 2 may be used to correlate roto-flap peening RPM to peening intensity, then verify that predicted intensity corresponding to a particular RPM is actually achieved. As stated above, roto-flap peening intensity is linearly related to flap speed as shown in FIG. 5. This linear relationship can be verified through successive iterations of roto-flap peening Almen strips as indicated at 100 then comparing that measured intensity with the output signal of the sensor indicated at 100. Additionally, if the sensor signal strength is linearly related to peening intensity and verified by the steps in FIG. 1, it may be possible to use the steps of FIG. 3, which skips the step of peening Almen strips 100 in FIG. 2 because the sensor has been verified as reliable. Thus, only the sensor is peened 110 in subsequent iterations as shown in FIG. 3. The flap speed in RPM of a roto-flap peening device should be linearly correlated to the output signal of the sensor as shown in FIG. 5. Thus, one can roto-flap peen with predictable intensity through the establishment of the foregoing relationships and this can be done without the use of conventional shot peening or Almen strips.

What is claimed is:

1. A method of calibrating an electronic sensor for peening intensity comprising the steps of:
    establishing a first intensity level for peening;
    setting first parameters for a first blast stream, said first parameters necessary to achieve said first intensity level;
    shot peening a test strip in said first blast stream;
    measuring an arc of said test strip shot peened in said first blast stream to determine said first intensity level;
    shot peening said sensor in said first blast stream set at said first parameters corresponding to said first intensity level and recording a first output signal of said sensor while said sensor is peened in said first blast stream;
    determining whether another intensity level should be measured;
    setting second parameters for another blast stream, said second parameters necessary to achieve said another intensity level upon determining other intensity levels should be measured;
    shot peening a test strip in said another blast stream said another intensity level being different than said first intensity level;
    measuring an arc of said test strip shot peened in said another blast stream set at said second parameters corresponding to said another intensity level and recording a second output signal of said sensor while said sensor is peened in said another blast stream; and
    relating each said intensity level at which each said test strip was peened to said senor output when said sensor was peened at said same intensity level as each said test strip.

2. The method of claim 1, further comprising the step of: making a chart relating said output signal of said sensor to each said intensity level.

3. The method of claim 1, wherein a roto-flap peening device is set to peen at each said intensity level;
    peening a test strip with said roto-flap peening device at each said intensity level;
    measuring the arc of each said test strip to confirm said intensity level;
    peening said sensor at each said intensity level;
    recording the signal from said sensor being peened at each said intensity level.

4. The method of claim 3, further comprising the step of making a chart relating each said output signal of said sensor peened by said roto-flap peening device to each said intensity level.

5. A method of calibrating an electronic sensor for peening intensity comprising the steps of:
    establishing a range of intensity levels for peening;
    setting parameters of a blast stream to achieve intensity levels within said range of intensity levels;
    subjecting test strips to each said blast stream within said range of intensity levels to peen each said test strip at each said intensity level within said range of intensity levels;
    measuring each arc of each said test strip from each said blast stream after each said strip has been peened at each said intensity level to confirm intensity;
    subject said sensor to each said blast stream at each said intensity level within said range of intensity levels and record each output signal of said sensor corresponding to each said intensity level; and
    relating each said intensity level to said corresponding signal at each said intensity level and create a chart relating each said intensity level to each said corresponding signal when said sensor was peened at said same intensity level as each said test strip.

6. The method of claim 5, further comprising the steps of: peening a corresponding test strip at each said intensity level within said range with said roto-flap peening device;
    measuring the arc of each said test strip peened with said roto-flap peening device to measure an intensity level from said roto-flap peening;
    peening said sensor with said roto-flap peening device at each said intensity level and recording an output signal of said sensor at each said intensity level; and
    relating each said intensity level within said range of intensity levels to a corresponding signal and creating a chart referencing each intensity level within said range of intensity levels to each said corresponding signal.

7. A method of calibrating an electronic sensor for peening intensity comprising the steps of:
    establishing a intensity level for peening;
    setting first parameters for a first blast stream corresponding to said first intensity level;
    shot peening a test strip in said first blast stream;
    measuring an arc of said test strip shot peened in said first blast stream to confirm said first intensity level;
    shot peening said sensor in said first blast stream set at said first parameters corresponding to said first intensity level and recording an output signal of said sensor while said sensor is peened in said first blast stream;

determining whether another intensity level should be measured;

setting second parameters for another blast stream corresponding to said another intensity level upon determining other intensity levels should be measured;

shot peening a test strip in said another blast stream;

measuring an arc of said test strip shot peened in said another blast stream set at said second parameters corresponding to said another intensity level and recording a second output of said sensor while said sensor is peened in said another blast stream;

relating each said intensity level at which said sensor was peened with said output signals of said sensor;

setting a roto-flap peening device to said first intensity level;

roto-flap peening a test strip at said first intensity level;

measuring said test strip that was roto-flap peened to verify said first intensity level;

peening said sensor with said roto-flap peening device set at said first intensity level; and measuring the output of said sensor when peened at said first intensity level.

8. The method of calibrating an electronic sensor for peening intensity as claimed in claim 7, wherein a chart is developed relating said signal of said sensor to a flap speed of said roto-flap peening device.

* * * * *